April 10, 1951 M. P. WINTHER 2,548,756
TRANSMISSION
Filed Nov. 27, 1946 2 Sheets-Sheet 1

Martin P. Winther,
Inventor.
Haynes and Koenig,
Attorneys.

April 10, 1951 M. P. WINTHER 2,548,756
TRANSMISSION
Filed Nov. 27, 1946 2 Sheets-Sheet 2
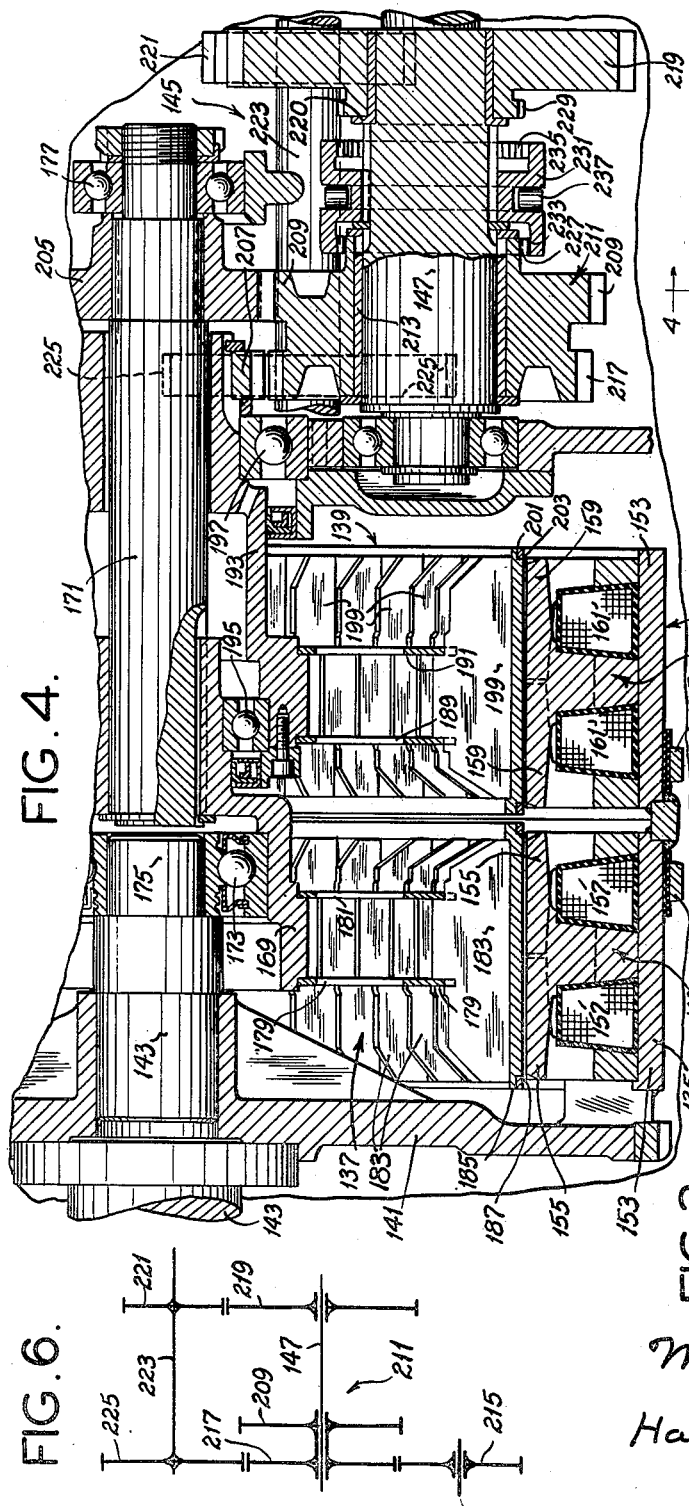
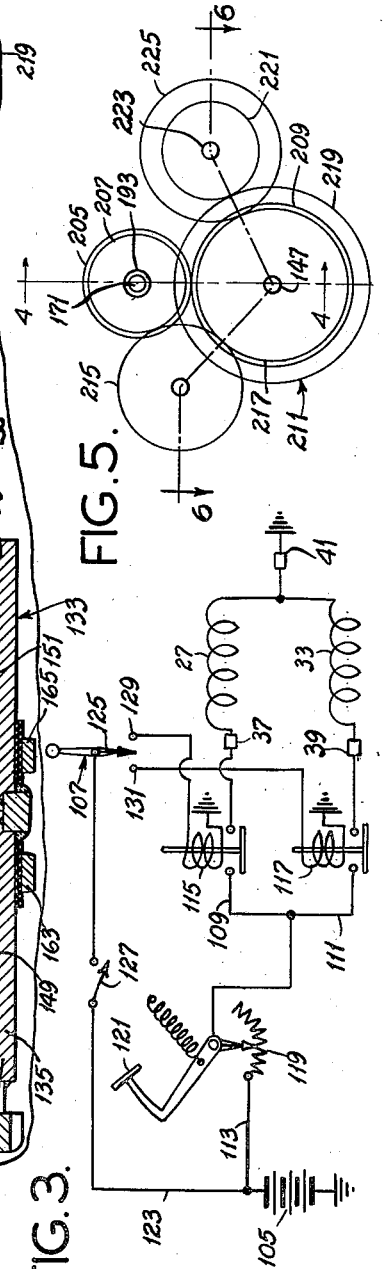
Martin P. Winther,
Inventor.
Haynes and Koenig
Attorneys.

Patented Apr. 10, 1951

2,548,756

UNITED STATES PATENT OFFICE 2,548,756

TRANSMISSION

Martin P. Winther, Waukegan, Ill., assignor to Martin P. Winther, as trustee

Application November 27, 1946, Serial No. 712,521

12 Claims. (Cl. 74—330)

This invention relates to transmissions and, more particularly, to automotive transmissions adapted to transmit torque in either forward or reverse direction.

Among the several objects of the invention may be noted the provision of an improved transmission, particularly for automotive transport vehicles, adapted to transmit different selected torques either in forward or reverse direction; the provision of a transmission of this class wherein the change between forward and reverse drive may be quickly and easily effected for complex "seesawing" maneuvering of the vehicle, without any shifting of gears; and the provision of a transmission such as described which is of compact, simplified and trouble-proof construction. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated:

Fig. 3 is a wiring diagram illustrating a control circuit for the transmission;

Fig. 4 is a longitudinal cross section through an alternative embodiment of the invention being taken on line 4—4 of Fig. 5;

Fig. 5 is a diagrammatic end view on a reduced scale of certain gearing of the transmission of Fig. 4, viewed from the right of Fig. 4; and, Fig. 6 is a diagrammatic kinematic layout of the gearing illustrated in Fig. 5, being a diagrammatic section taken on line 6—6 of Fig. 5.

Similar reference characters indicate corresponding parts throughout the several views of the drawings.

The transmissions of this invention are particularly adapted for use in small internal combustion engine-driven tow trucks or tractors such as are employed for conveying and handling materials in factories, yards, warehouses and the like. It is desirable that such trucks be capable of being "seesawed," i. e., maneuvered very quickly backward and forward, to expedite handling of materials. This requires a transmission wherein shifting between forward and reverse drive may be quickly and easily effected without gear clashing. It is also desirable that the transmission for such a vehicle have high and low speed ranges so that it may transmit low or high torque either in forward or reverse direction, as circumstances may require. Heretofore, these desirable features have been attained only in tow trucks having electric motor drives, but these are costly, complex and troublesome. This invention provides an improved transmission wherein the stated desirable features are attained in a compact, rugged and trouble-proof structure having a small number of parts.

Figure 1:
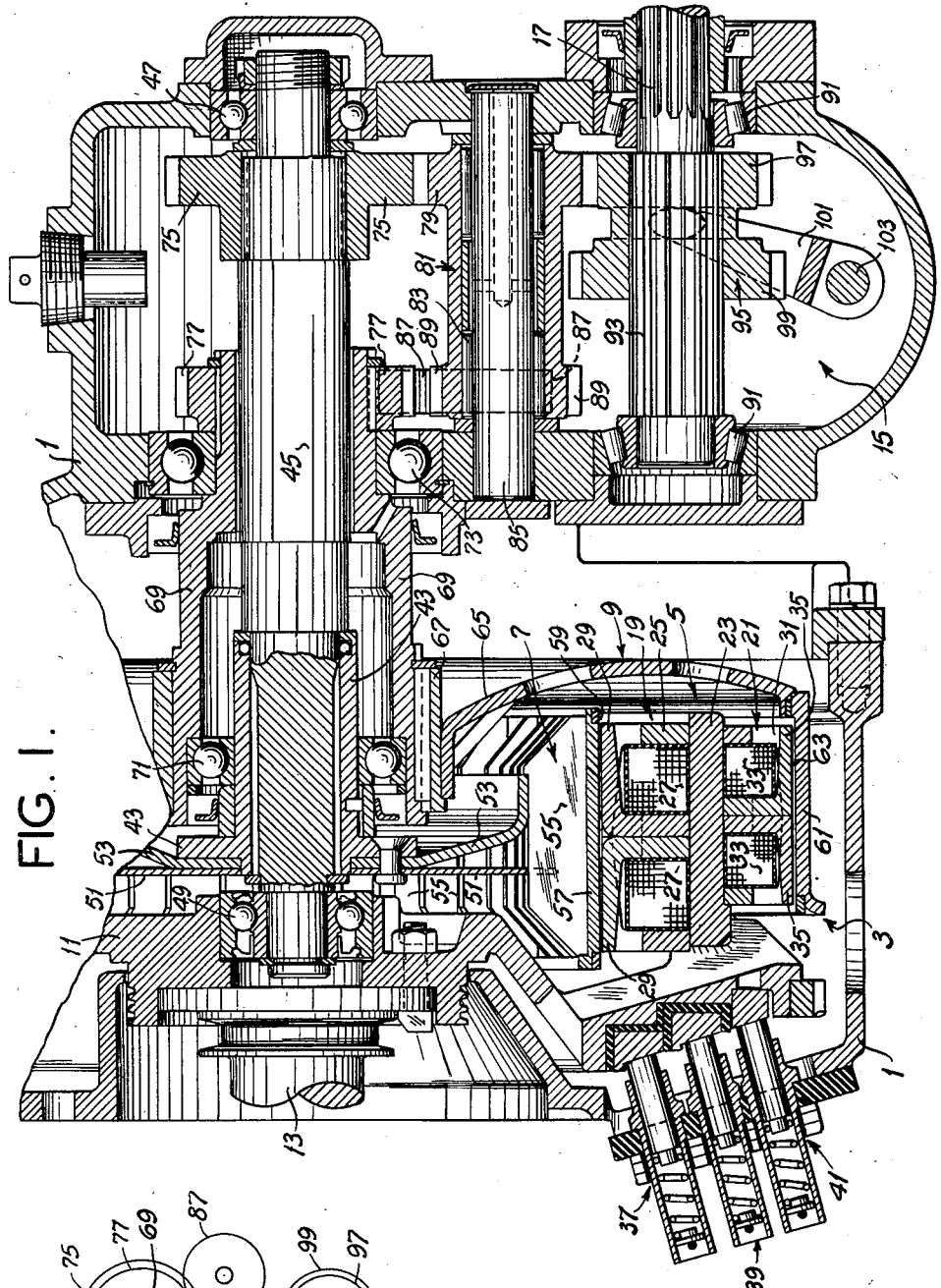
Fig. 1 is a longitudinal cross section through a preferred embodiment of the invention.
Figure 2:
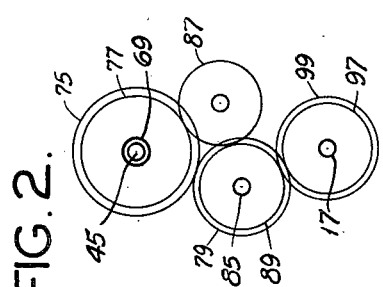
Fig. 2 is a diagrammatic end view on a reduced scale of certain gearing of the transmission of Fig. 1, viewed from the right of Fig. 1.

Referring to the drawings, Figs. 1 and 2 illustrate the construction of the preferred embodiment of this invention. The transmission therein disclosed is shown to be enclosed within a housing 1 and to include a dual inductive coupling 3, specifically an eddy-current slip coupling, comprising a driving element 5 and two driven elements 7 and 9. The driving element 5 is mounted upon the usual flywheel 11 of the vehicle, this flywheel being bolted to the crankshaft 13 of the prime mover (not shown) for the vehicle. The transmission also includes means embodying a change-speed gearing device 15 whereby output shaft 17 of the transmission may be driven either in forward or reverse direction, at high or low speed to transmit low or high torque in either direction, as will be made clear.

The driving element 5 of the coupling 3 comprises two independently energizable field members 19 and 21 which are conjointly mounted upon the flywheel 11. As illustrated in Fig. 1, a drum 23 is secured as by welding to the flywheel and extends axially inward and in concentric relation thereto. Field member 19 is fitted within this drum and field member 21 is fitted over its outer periphery. Field member 19 comprises an assembly of four magnetic annular toothed rings 25 in magnetic inductive relation to a magnetizing field coil 27 comprising a pair of annular coils confined between the rings and the inner periphery of the drum. The teeth 29 of the rings form an annular staggered sequence of inwardly facing magnetic pole teeth. Field member 21 comprises an assembly of four magnetic annular toothed rings 31 in magnetic inductive relation to a magnetizing field coil 33 comprising a pair of annular coils confined between the rings and the outer periphery of the drum. The teeth 35 of the rings 31 form an annular staggered sequence of outwardly facing magnetic pole teeth. The field member assemblies are similar to those disclosed in my copending application for Eddy-Current Coupling, Serial No. 693,057, filed August 26, 1946, eventuated as Patent 2,452,820.

The arrangement is such that field members 19 and 21 are concentric and substantially coplanar, member 19 being within member 21. The inner field member 19 and the outer field member 21 are independently energizable through their respective coils by current fed thereto through collector ring and brush devices 37 and 39, respectively. The coils of both field members are grounded through a common return collector ring and brush device 41. As illustrated, the collector rings are fixed within concentric annular grooves in the outer face of flywheel 11, and the brushes are mounted upon the housing 1.

The driven element 7 is concentrically disposed within the inner field member 19. It includes a hub 43 keyed upon a shaft 45 which extends longitudinally through housing 1, being journalled at one end in a bearing 47 in an end wall of the housing and at its other end in a pilot bearing 49 in the flywheel 11. Fixed to the hub are supporting plates 51 and 53. These plates support a plurality of axially extending flexible fins 55 which carry an inductor element 57 comprising magnetic ring segments forming a discontinuous inductor ring. This ring is disposed within field member 19, being spaced from the faces of pole teeth 29 by a small flux air gap 59. Fins 55 are sufficiently flexible to permit the ring segments of inductor ring 57 to yield inward, if necessary, to prevent binding of the ring in field member 19. The driven element 7 thus forms a driven inductor member similar to that disclosed in my aforesaid patent.

The driven element 9 comprises a magnetic inductor element formed as a drum 61 which surrounds the pole teeth 35 of outer field member 21 with a small flux air gap 63 therebetween. Drum 61 is carried by a spider 65 having a hub 67 keyed on a sleeve 69. This sleeve surrounds shaft 45 and is journalled for rotation relative thereto by means of bearings 71 and 73.

From the above, it will be clear that when field member 19 is energized by passage of current through its coil, the driven inductor member 7 will be inductively driven to rotate shaft 45 in the same direction as flywheel 11. Alternatively, when field member 21 is energized by passage of current through its coil (field member 19 being deenergized), the driven inductor member 9 will be inductively driven to rotate sleeve 69 in the same direction as flywheel 11. Rotation of shaft 45 is utilized to effect forward drive of output shaft 17. Rotation of sleeve 69 is utilized to effect reverse drive of output shaft 17.

A forward drive gear 75 is keyed upon shaft 45 adjacent bearing 47. A reverse drive gear 77 is keyed upon the end of sleeve 69 extending through bearing 73. Gear 75 meshes with a gear 79 of an idler cluster gear or intermediate rotary member 81 journalled by means of needle bearings 83 on a fixed shaft 85. Gear 77 meshes with an idler 87, which in turn meshes with a gear 89 of cluster gear 81. This arrangement is such that when forward drive gear 75 is driven by inductor member 7, it rotates cluster 81 in one direction. When reverse drive gear 77 is driven by inductor member 9, it rotates cluster 81 in the opposite direction. Gear 79 of cluster 81 is of larger pitch diameter than gear 89.

Output shaft 17 is journalled for rotation in tapered roller bearings 91 in axially spaced walls of housing 1 and is splined, as indicated at 93, between these bearings. A gear cluster or shiftable member 95 comprising gear 97, adapted to mesh with gear 79, and gear 99, adapted to mesh with gear 89, is slidably keyed on the splined portion of shaft 17. This cluster 95 comprises the shiftable element of the change-speed gearing 15 and is slidable between a position wherein gears 79 and 97 are in mesh for high-speed, low-torque drive and a position wherein gears 89 and 99 are in mesh for low-speed, high-torque drive of output shaft 17. Axial movement of cluster 95 is effected by means of a shifting fork 101 fixed on a transverse shaft 103 adapted to be rotated by a suitable manual shift lever (not shown).

Referring now to Fig. 3, it will be seen that the coils 27 and 33 of field members 19 and 21, respectively, are adapted to be quickly selectively energized from a suitable source of current 105, such as the battery of the vehicle, under control of a double-throw direction selector switch 107. Coils 27 and 33 are connected in parallel lines 109 and 111, respectively, fed by a power line 113. Lines 109 and 111 include relays 115 and 117, respectively; also the brushes 37 and 39, respectively. The return from these lines to the battery is via brush 41 and ground. Power line 113 includes a variable resistor 119 under control of a pedal 121.

A control line 123 is connected between the source of current and the blade 125 of selector switch 107. This line preferably includes the ignition switch 127 of the vehicle. Blade 125 is movable into engagement either with forward drive contact 129 or reverse drive contact 131. The coil of relay 115 is in series in a line connected between contact 129 and ground. The coil of relay 117 is in series in a line connected between contact 131 and ground. The arrangement is such that, with ignition switch 127 closed, selector switch 107 may be operated to engage its blade with contact 129, thereby completing a circuit through the coil of relay 115 to close it. With relay 115 closed, a circuit is completed through lines 113 and 109 to energize coil 27. Alternately, selector switch 107 may be operated to engage its blade with contact 131, thereby completing a circuit through the coil of relay 117 to close it. With relay 117 closed, a circuit is completed through lines 113 and 111 to energize coil 33.

Variable resistor 119 controls the energization of the field coils 27 and 33. When pedal 121 is depressed, resistance is inserted in line 113 to diminish energization of one or the other of field coils 27 or 33 (depending upon whether blade 125 is engaged with contact 129 or 131). This diminishes the energization of the respective field member 19 or 21 and consequently decelerates the respective driven inductor member 7 or 9. Deceleration of inductor member 7 or 9 reduces the forward or reverse input speed, respectively, to change-speed gear device 15. It is intended that pedal 121 be operated in the manner of a conventional automotive clutch pedal for reducing the speed of the input to change-speed gear device 15 for facilitating shifting between high and low speeds in either forward or reverse direction. Pedal 121 may also be depressed to decelerate for smooth change-over between forward and reverse.

The operation of this embodiment of the transmission of this invention is as follows:

Assume that the vehicle is at standstill with ignition switch 127 closed, the prime mover of the vehicle driving flywheel 11 and the drive element 5 of the coupling 3, and that gear cluster 95 is in a neutral position between gears 79 and 89. To start the vehicle moving forward at low speed with high-torque transmission, the operator manipulates selector switch 107 to engage its blade 125 with forward drive contact 129. This closes relay 115 and completes the circuit through line 113, line 109 and coil 27 to energize the inner field member 19 of the coupling. With inner field member 19 energized, driven inductor element 7 is inductively driven to rotate shaft 45 and forward drive gear 75 in the same direction as the flywheel. Gear 75 thereupon drives cluster 81.

The operator then depresses clutch pedal 121, thereby inserting resistance in the circuit for coil 27 to diminish its energization and thus to diminish the speed of shaft 45, gear 75 and cluster 81. He may then readily shift gear cluster 95 to the left, as viewed in Fig. 1 by means of shifter fork 101 to mesh gears 89 and 99. This shifting is facilitated by the low-speed rotation of gear 89. With gears 89 and 99 in mesh, forward low-speed high-torque drive of output shaft 17 is effected through the compound gear train including gears 75, 79, 89 and 99. Upon release of the clutch pedal 121, the resistance in the power circuit for coil 27 is reduced, and coil 27 is energized at maximum value. The vehicle thereupon is driven forward at low speed with high-torque drive.

To shift into high speed, the operator depresses pedal 121 to again insert resistance in the power circuit for coil 27 to reduce the speed of the gears in the change-speed gear device, and then shifts cluster 95 to the right to mesh gears 79 and 97. This effects high-speed low-torque drive of output shaft 17 through the simple gear train including gears 75, 79 and 97 (Fig. 1).

During forward drive of the vehicle at either high or low speed, gear 89 of the cluster 81 drives idler 87, gear 77, sleeve 69 and driven element 9; but these parts merely idle.

Assume now that it is desired to reverse the direction of movement of the vehicle. To bring this about, it is merely necessary for the operator to manipulate selector switch 107 to engage its blade 125 with reverse drive contact 131. This opens relay 115 and deenergizes coil 27. It closes relay 117 and completes a circuit through coil 33 to energize the outer field member 21 of the coupling. With outer field member 21 energized, driven inductor element 9 is inductively driven to rotate sleeve 69 and reverse drive gear 77 in the same direction as the flywheel. Gear 77, through idler 87 and gear 89, drives cluster 81 in the direction opposite to that in which it is driven during forward drive of the vehicle. If desired, clutch pedal 121 may be depressed prior to changing direction to insert resistance in the line to decelerate the gearing and avoid jarring.

Assuming that cluster 95 has remained in its right-hand position, output shaft 17 is thereupon driven in the reverse direction at high speed with low-torque transmission through the compound gear train including gears 77, 87, 89, 79 and 97. If it is desired now to shift into low gear, the operator will depress pedal 121 to insert resistance into the power circuit for coil 33 to decelerate sleeve 69, gear 77, gear 87 and cluster 81. He thereupon shifts cluster 95 to the left to mesh gears 89 and 99. Shifting is facilitated by reason of the deceleration above described. Output shaft 17 is thereupon driven in reverse direction at low speed with high-torque transmission through the simple gear train including gears 77, 87, 89 and 99. During this operation, gear 79 drives gear 75, shaft 45 and driven element 7, but these parts merely idle.

Thus, for either of the speed-torque conditions, depending upon selection of mesh of either of gears 97 or 99 (as determined by the position of the mechanical shifting fork 101), extremely fast alternating reversing direction of the vehicle may be accomplished electrically by operating the easily controlled switch 107. This is very serviceable in the case of small service loading trucks operating in closely confined quarters, as in a warehouse. It permits of quick backward and forward "seesawing" under either low-torque, high-speed operation; or high-torque, low-speed operation. With an ordinary mechanical gearshift the time consumed in such "seesawing" is far in excess of that consumed with the present invention. Furthermore, the electric reversing scheme is much easier on the mechanical parts of the transmission, since no gears need to be meshed and unmeshed for the quick reversals. The required meshing and unmeshing at gears 97 and 99 is not so troublesome because shifts for high-speed and low-speed operation occur less frequently in the class of service envisaged herein.

Figs. 4–6 illustrate an alternative embodiment of the transmission of the invention. In this embodiment, a modified dual eddy-current inductive coupling 133 (corresponding to coupling 3 previously described) includes a driving element 135 and two driven elements 137 and 139. Driving element 135 is mounted upon vehicle flywheel 141, fixed to crankshaft 143. This transmission includes a modified changespeed gear device 145 whereby output shaft 147 may be driven either in forward or reverse direction, at selective speeds for selective torque transmission in either direction.

The driving element 135 comprises two independently energizable field members 149 and 151 which are conjointly mounted upon flywheel 141. These field members correspond to field members 19 and 21, but instead of being mounted in coplanar relation with one within a drum and the other outside the drum, both are mounted in coaxial spaced relation within a drum 153. This drum is secured to the inner face of the flywheel and extends axially inward, in concentric relation thereto.

Each of field members 149 and 151 comprises an assembly similar to the inner field member 19. Thus, member 149 includes an annular staggered sequence of inwardly facing pole-forming teeth 155 in magnetic inductive relation to a magnetizing field coil including two annular coils 157. Member 151 includes an annular staggered sequence of inwardly facing pole-forming teeth 159 in magnetic inductive relation to a magnetizing field coil including two annular coils 161. Member 149 is telescoped within drum 153 adjacent flywheel 141. Member 151 is telescoped within the drum adjacent its open end. The field members 149 and 151 are independently energizable through their respective coils by current fed thereto through collector rings 163 and 165, respectively. The coils of both field members are grounded for return of current in any suitable way.

The driven element 137 is concentrically disposed within field member 149. It is includes a hub 169 keyed upon one end of a shaft 171 concentric with crankshaft 143. This end of the shaft is supported for rotation by means of a pilot bearing 173 between the hub and an extension 175 of the crankshaft. The other end of shaft 171 is journalled in a bearing 177. Fixed to the hub are axially spaced supporting plates 179 and 181. These plates support a plurality of axially extending flexible fins 183 which carry ring segments forming a discontinuous inductor ring 185. This ring is disposed within field member 149, being spaced from the faces of pole teeth 155 by a small flux air gap 187.

The driven element 139 is concentrically disposed within field member 151. It includes a pair of axially spaced supporting plates 189 and 191 fixed on a sleeve 193 surrounding shaft 171 and journalled for rotation relative thereto by means of bearings 195 and 197. Plates 189 and 191 support a plurality of axially extending flexible fins 199 which carry ring segments forming a discontinuous inductor ring 201. This ring is disposed within field member 151, being spaced from the faces of pole teeth 159 by a small flux air gap 203.

Thus, in this modification, each of driven elements 137 and 139 is in the form of a driven inductor member, such as more particularly disclosed in my aforesaid patent. When field member 149 is energized by passage of current through its coil 157, driven inductor member 137 is inductively driven to rotate shaft 171 in the same direction as flywheel 141. Alternatively, when field member 151 is energized by passage of current through its coil 161 (field member 149 being deenergized), the driven inductor member 139 is inductively driven to rotate sleeve 193 in that same direction. Rotation of shaft 171 is utilized to effect forward drive of output shaft 147. Rotation of sleeve 193 is utilized to effect reverse drive of output shaft 147.

A forward drive gear 205 is keyed on the right end of shaft 171 and a reverse drive gear 207 is keyed on the right end of shaft 171 and a reverse drive gear 207 is keyed on the right end of sleeve 193. Gear 205 meshes with gear 209 of a gear cluster 211 or first intermediate member rotatably mounted on output shaft 147 by means of a bushing 213. Gear 207 meshes with an idler 215, which in turn meshes with gear 217 of cluster 211.

A gear 219 or second intermediate member is rotatably mounted on output shaft 147 by means of a bushing 220 axially spaced from cluster 211. This gear 219 is in mesh with a gear 221 on a lay shaft 223 having a gear 225 thereon in mesh with gear 217 of cluster 211. The pitch diameters of the gears are such that the train of gears 225 and 221 between gear 217 and gear 219 functions as a speed-reducing gear train so that gear 219 rotates at a lower speed than cluster 211.

Means is provided whereby cluster 211 may be coupled to output shaft 147 to drive it at high speed with corresponding low-torque transmission or, selectively, gear 219 may be coupled to the shaft to drive it at low speed with corresponding high-torque transmission. As illustrated, cluster 211 and gear 219 are formed with sets of clutch teeth 227 and 229, respectively, on their mutually adjacent sides. A shiftable clutch element 231 having sets of clutch teeth 233 and 235 for mating engagement with sets 227 and 229, respectively, is splined on shaft 147 between cluster 211 and gear 219 so as to be keyed thereto but axially slidable thereon. Clutch element 231 is adapted to be shifted between a position wherein teeth 227 and 233 are mated and a position wherein teeth 229 and 235 are mated by a suitable shifter fork 237. In the first of these positions, cluster 211 is coupled to output shaft 147 to drive it at high speed and gear 219 idles on the shaft. In the second position, gear 219 is coupled to shaft 147 to drive it at low speed, and cluster 211 idles on the shaft. Thus member 231 and teeth 227 and 229 constitute a selective dental clutch construction for selectively connecting gears 211 or 219 to shaft 147.

It will be understood that the electrical control for the coils 157 and 161 of field members 149 and 151 may be identical with that for the coils 27 and 33 of field members 19 and 21, such as illustrated in Fig. 3.

The operation of the embodiment of Figs. 4-6 is as follows:

To drive the vehicle forward at high speed, clutch element 231 is shifted to the left as viewed in Fig. 4 to mesh clutch teeth 227 and 233. Coils 157 are energized to energize field member 149 inductively to drive driven inductor element 137 and rotate shaft 171 and forward drive gear 205 in the same direction as flywheel 141. Gear 205 drives gear 209 and cluster 211 in forward direction. Cluster 211 is coupled through the dental clutch element 231 to drive the output shaft 147 in the forward direction at high speed with low-torque transmission. During this operation, gear 217 of cluster 211 drives gear 215, reverse drive gear 207, sleeve 193 and driven element 139, but these parts merely idle. It also drives gear 225, lay shaft 223, gear 221 and gear 219, but these parts also merely idle.

If it is necessary to shift into low speed for high-torque transmission, clutch element 231 is shifted to the right to mesh clutch teeth 229 and 235. Cluster 211 thereupon rotates idly on shaft 147, but a drive for output shaft 147 is established through gear 217 on cluster 211, gear 225, lay shaft 223, gear 221, gear 219, and clutch element 231. Gear 219 is rotated in the same direction as cluster 211 since the gears on the lay shaft function as idlers. It is also rotated at low speed to drive shaft 147 at low speed by reason of the speed-reducing function of gears 225 and 221.

To drive the vehicle in reverse direction, it is merely necessary to deenergize field member 149 and energize field member 151. The driven inductor member 139 is thereupon inductively driven to rotate sleeve 193 and reverse drive gear 207. Gear 207, through idler 215, drives gear 217 and cluster 211 in reverse direction. With the cluster coupled to output shaft 147 by means of clutch element 231, the output shaft is driven in reverse direction at high speed with low-torque output. Alternatively, clutch element 231 may be shifted to couple gear 219 to shaft 147, whereupon shaft 147 is driven in reverse direction at low speed with high-torque output. During reverse drive operation, gear 209 of cluster 211 drives forward drive gear 205, shaft 171 and driven element 137, but these parts merely idle.

Thus, the transmission of either embodiment is adapted to transmit a selected torque either in forward or reverse direction. The change between forward and reverse drive is effected by selectively energizing one or the other of the two field members of the coupling driving element under control of selector switch 107. No shifting of gears is involved in making this change and it may therefore be easily and quickly effected. Both transmissions disclosed are of compact, simplified and rugged construction. The coplanar arrangement of field members 19 and 21 in the embodiment of Fig. 1 is preferred where the length of the transmission is to be kept at a minimum. Furthermore, due to the relatively large amount of torque which may be transmitted by a relatively small eddy-current coupling of the type shown, the diameter of the coupling and transmission may be kept at a minimum.

It is intended that the operator coordinate the operation of pedal 121 with the operation of the switch lever 107 as an ordinary automotive vehicle clutch pedal is coordinated with the ordinary gearshift lever. That is to say, during the time that the lever 107 passes through the neutral position shown in Fig. 3, the pedal 121 will be depressed, which means that a maximum amount of the resistance 119 will be in the circuit and the energization of the electric clutches will therefore be modulated under starting conditions either in forward or reverse. It is also preferable that the operator operate the mechanical gearshift lever 101 during the time that the pedal 121 is depressed, particularly when lever 107 is in a non-neutral position, because this will slow down the driven elements of the clutch to make gear meshing easier. The condition of the pedal 121 being depressed and lever 107 in a non-neutral position is preferably during gearshifting (as compared to having lever 107 in neutral), particularly if the vehicle is stationary, in order to avoid the possibility of tooth interference which might prevent completion of a shift operation.

In the Fig. 1 embodiment, coils 27 include more ampere turns than coils 33, pole teeth 29 are larger than pole teeth 33, and ring 57 is wider than ring 61. The reason for this is to transmit substantially the same amount of torque through driving element 5 and driven element 7 as through driving element 5 and driven element 9. Since the drive through element 9 has a greater mechanical advantage than the drive through element 7 (ring 61 having a greater radius than ring 57), it is necessary to establish a greater flux density between field member 19 and ring 57 than between field member 21 and ring 61 for equalization of torque transmission by the coupling through its respective driven elements. In the Fig. 4 embodiment, the field members are of equal size in cross section since they are of the same diameter.

It will be understood that the transmissions herein disclosed are applicable for uses other than as automotive vehicle transmissions. They are particularly suitable, however, for use in small internal combustion engine driven service trucks, inasmuch as they make such trucks as easy to operate as prior electric motor driven trucks, without the disadvantages attendant upon the use of the latter.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A reversing and change-speed transmission comprising a rotary driving element and two coaxial rotary driven elements, rotary inductive electric slip couplings between the driving element and the respective driven elements for effecting movements of the driven elements in the same rotary directions, separately energizable field coils in said inductive couplings, means for selectively energizing said field coils for alternately effecting the couplings to the driven elements from the driving element, a driven gear cluster, forward and reverse gear connections from the respective driven elements to said cluster for reversably driving the cluster according to the energization of the respective field coils, a driven output shaft to be driven, and selectively operable change gear-means between said output shaft and said cluster.

2. A reversing and change-speed transmission comprising a rotary driving element and two coaxial and substantially coplanar rotary driven elements, rotary inductive electric slip couplings between the driving element and the respective driven elements for effecting rotary movements of the driven elements in the same direction, separately energizable field coils in said inductive couplings, means for selectively energizing said field coils for alternately selecting the drives to the driven elements from the driving element, a driven change-speed cluster, forward and reverse gear connections from the respective driven elements to said cluster for reversably driving the cluster according to the energization of the respective field coils, a driven output shaft to be driven, and selectively operable change-speed gear means between said output shaft and said cluster.

3. A reversing and change-speed transmission comprising a rotary driving element and two coaxial and substantially collinear rotary driven elements, rotary inductive electric slip couplings between the driving element and the respective driven elements for effecting rotary movements of the driven elements in the same direction, separately energizable field coils in said inductive couplings, means for selectively energizing said field coils for alternately selecting the drives to the driven elements from the driving element, a driven change-speed cluster, forward and reverse gear connections from the respective driven elements to said cluster for reversably driving the cluster according to the energization of the respective field coils, a driven output shaft to be driven, and selectively operable change-speed gear means between said output shaft and said cluster.

4. In a transmission, an inductive coupling comprising a driving element including two independently energizable annular field members arranged for conjoint rotation in concentric, substantially coplanar relation, one within the other, a driven member having an inductor element within the inner field member in inductive relation thereto, a driven member having an inductor element surrounding the outer field member in inductive relation thereto, an output shaft, a selectively connectible gear train for driving from one of said driven members to said shaft for driving it in one direction upon energization of the related field member and another selectively connectible gear train for driving from the other driven member to said shaft for driving it in the opposite direction upon energization of the other field member.

5. In a transmission, an inductive coupling comprising a driving element including two independently energizable annular field members arranged for conjoint rotation in concentric axially spaced relation, a driven inductor member within one field member in inductive relation thereto, a driven inductor member within the other field member in inductive relation thereto, an output shaft, and a selectively connectible gear train for driving from one of said inductor members to said shaft for driving it in one direction upon energization of the related field member and another selectively connectible gear train for driving from the other inductor member to said shaft for driving it in the opposite direction upon energization of the other field member.

6. In a transmission, an inductive coupling comprising a driving element including two independently energizable annular field members arranged for conjoint rotation in concentric axially spaced relation, a driven inductor member within one field member in inductive relation thereto, a driven inductor member within the other field member in inductive relation thereto, an output shaft, and a selectively connectible gear train for driving from one of said inductor members to said shaft for driving it in one direction upon energization of the related field member and another selectively connectible gear train for driving from the other inductor member to said shaft for driving it in the opposite direction upon energization of the other field member, said gears including a change-speed device whereby said shaft may be driven at different speeds with different torques in either direction of rotation.

7. In combination, a pair of coaxially aligned selectively operable eddy-current clutches, a transmission main shaft driven by one of said clutches, a quill rotatably journalled on said main shaft and driven by the other of said clutches, a driven shaft, a pair of gear trains between said main shaft and driven shaft and rotatable relative to said driven shaft, a gear on said quill, reverse gearing between said quill gear and the rotatable portion of one of said gear trains, and means on said driven shaft intermediate said gear trains for selectively coupling either of said gear trains to said shaft.

8. In a transmission, an inductive coupling comprising a driving element and two driven elements, means for selectively inductively coupling said driving element with one or the other of said driven elements for rotation in the same direction, an output shaft, an intermediate rotary member, a forward driving gear train from one of said driven elements to the intermediate member and a reverse driving gear train from the other of said driven elements to said intermediate member, and a shiftable member in driving connection with the output shaft and including selectively operable meshing means adapted to form when said shiftable member is shifted back or forth two different geared connections between the intermediate member and the output shaft respectively of different speed ratios operative in either direction of rotation of said intermediate member.

9. In a transmission, an inductive coupling comprising a driving element including two independently energizable field members, each including a field coil, a circuit for said field coils including a source of current and a selector switch adapted selectively to complete the circuit through one coil or the other for selectively energizing said field members, two driven inductor members in inductive relation to the field members for movement in the same direction, an output shaft, an intermediate rotary member, a forward driving gear train from one of said driven members to the intermediate member and a reverse driving gear train from the other of said driven members to said intermediate member, and a shiftable member in driving connection with the output shaft and including selectively operable meshing means adapted to form when said shiftable member is shifted back or forth two selectively operable and independent driving connections between the intermediate member and the output shaft respectively of different speed ratios operative in either direction of rotation of said intermediate member.

10. In a transmission, an eddy-current slip coupling comprising a driving element including two independently energizable field members, each including a field coil, said coils being arranged in parallel connections in a power line, each of said connections including a relay, a control circuit including a selector switch adapted in one position to operate one relay and in another position to operate the other relay, a pedal-operated variable resistor in said power line adapted to control the energization of each of said coils, two driven eddy-current inductor members in inductive relation respectively to the field members for rotation in the same direction, an output shaft, an intermediate rotary member, a forward driving gear train from one of said driven members to the intermediate member and a reverse driving gear train from the other of said driven members to said intermediate member, a shiftable member in driving connection with the output shaft and including selectively operable meshing means adapted to form when said shiftable members is shifted back and forth two selectively operable and independent driving connections between the intermediate member and the output shaft respectively of different speed ratios operative in either direction of rotation of said intermediate member.

11. In a transmission, an inductive coupling comprising a driving element and two driven elements, means for selectively inductively coupling said driving element with one or the other of said driven elements for rotation in the same direction, an output shaft, an intermediate gear cluster having two gears, a direct gear connection from one of said driven elements to one of said cluster gears and a reverse gear connection from the other driven element to the other of said cluster gears, and a gear cluster splined with respect to the output shaft and having two gears one of which is adapted to be meshed with one of the gears of said intermediate cluster and the other of which is adapted to be meshed with the other gear of said intermediate cluster, said meshes being selective and independent upon shifting of the splined cluster.

12. In a transmission, an inductive coupling comprising a driving element and two driven elements, means for selectively inductively coupling said driving element with one or the other of said driven elements for rotation in the same direction, an output shaft, a first intermediate member rotary on the output shaft and comprising two gears, a second intermediate member rotary on the output shaft and comprising a single gear, a geared connection from said single gear of the second intermediate member to a gear of the first intermediate member, a direct gear drive from one of said driven elements to one of the gears of the first intermediate member and a reverse gear drive from the other driven element to the other gear of the first intermediate member, and a shiftable clutch element splined to the output shaft and alternately engageable with the first or the second intermediate member to form selective connections between them and the output shaft.

MARTIN P. WINTHER.

REFERENCES CITED

The following references are of record in the file of this patent:

UNITED STATES PATENTS

| Number | Name | Date |
|---|---|---|
| 1,265,078 | Grote | May 7, 1918 |
| 2,058,736 | Stauffer et al. | Oct. 27, 1936 |
| 2,304,032 | Schmitter | Dec. 1, 1942 |
| 2,321,226 | McKay | June 8, 1943 |
| 2,344,656 | Swennes | Mar. 21, 1944 |